US012659258B2

(12) United States Patent
Patel et al.

(10) Patent No.: US 12,659,258 B2
(45) Date of Patent: Jun. 16, 2026

(54) PROCESSING DATA CONNECTION REQUESTS FROM EDGE DEVICES

(71) Applicant: INTERNATIONAL BUSINESS MACHINES CORPORATION, Armonk, NY (US)

(72) Inventors: Kushal S. Patel, Pune (IN); Gandhi Sivakumar, Bentleigh (AU); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 18/048,126

(22) Filed: Oct. 20, 2022

(65) Prior Publication Data

US 2024/0137303 A1     Apr. 25, 2024
US 2024/0235980 A9     Jul. 11, 2024

(51) Int. Cl.
*H04L 45/02*          (2022.01)
*H04L 41/0806*        (2022.01)

(52) U.S. Cl.
CPC .......... *H04L 45/02* (2013.01); *H04L 41/0806* (2013.01)

(58) Field of Classification Search
CPC ............................. H04L 45/02; H04L 41/0806
See application file for complete search history.

(56) References Cited

U.S. PATENT DOCUMENTS

| | | | | |
|---|---|---|---|---|
| 11,190,614 B2 * | 11/2021 | Dar | ....................... | H04L 67/141 |
| 2003/0033394 A1 * | 2/2003 | Stine | ................. | H04W 52/0216 |
| | | | | 709/222 |

| | | | | |
|---|---|---|---|---|
| 2006/0062383 A1 * | 3/2006 | Kaneda | ................. | G06F 21/805 |
| | | | | 713/193 |
| 2009/0292643 A1 * | 11/2009 | Wu | ........................ | G06Q 30/02 |
| | | | | 715/255 |
| 2011/0002240 A1 | 1/2011 | Harel et al. | | |
| 2011/0267942 A1 * | 11/2011 | Aybay | ................. | H04L 41/0816 |
| | | | | 370/388 |
| 2013/0329601 A1 | 12/2013 | Yin et al. | | |
| 2018/0184143 A1 * | 6/2018 | Davis | ................. | H04N 21/6118 |
| 2021/0409112 A1 * | 12/2021 | Chen | ................... | H04J 14/0271 |

(Continued)

OTHER PUBLICATIONS

Cisco.com, "Routing Configuration Guide for vEdge Routers, Cisco SD-WAN Release 20.x", Jun. 17, 2022, 43p.

(Continued)

*Primary Examiner* — Will W Lin
(74) *Attorney, Agent, or Firm* — CANTOR COLBURN LLP; Tihon Poltavets

(57)                ABSTRACT

A computer-implemented method for processing data connection requests is provided. The computer-implemented method includes receiving a connection request from an edge device and responding to the edge device such that the edge device recognizes that a connection is established and that data cannot be sent. The method further includes receiving a response from the edge device indicative of a connection parameter, determining that the connection is fiber-allocatable in accordance with the connection parameter being of a first connection parameter type, selecting one fiber from a plurality of fibers to have the connection allocated thereto based on one or more rules of fiber selection responsive to the determining that the connection is fiber-allocatable and allocating the connection to the one fiber.

17 Claims, 4 Drawing Sheets

(56) References Cited

U.S. PATENT DOCUMENTS

2023/0319444 A1 * 10/2023 Chen ..................... H04J 14/052
                                                         398/58
2023/0385089 A1 * 11/2023 Sidis .................. G06F 9/45508

OTHER PUBLICATIONS

Desai, "Edge-based Optimal Routing in SDN-enabled Industrial Internet of Things", IEEE Internet of Things Journal, Mar. 29, 2022, 2p.

Peppers, "Implementing and configuring Modern SANs with NVMe/FC", Jun. 2021 | TR-4684 | Version 6, 45p.

Seagate. "Cloud Computing and Cloud Storage Architectures", retrieved from web https://web.archive.org/web/20170809174318/https://www.seagate.com/in/en/tech-insights/cloud-compute-and-cloud-storage-architecture-master-ti/, Aug. 9, 2017, 5 pages.

* cited by examiner

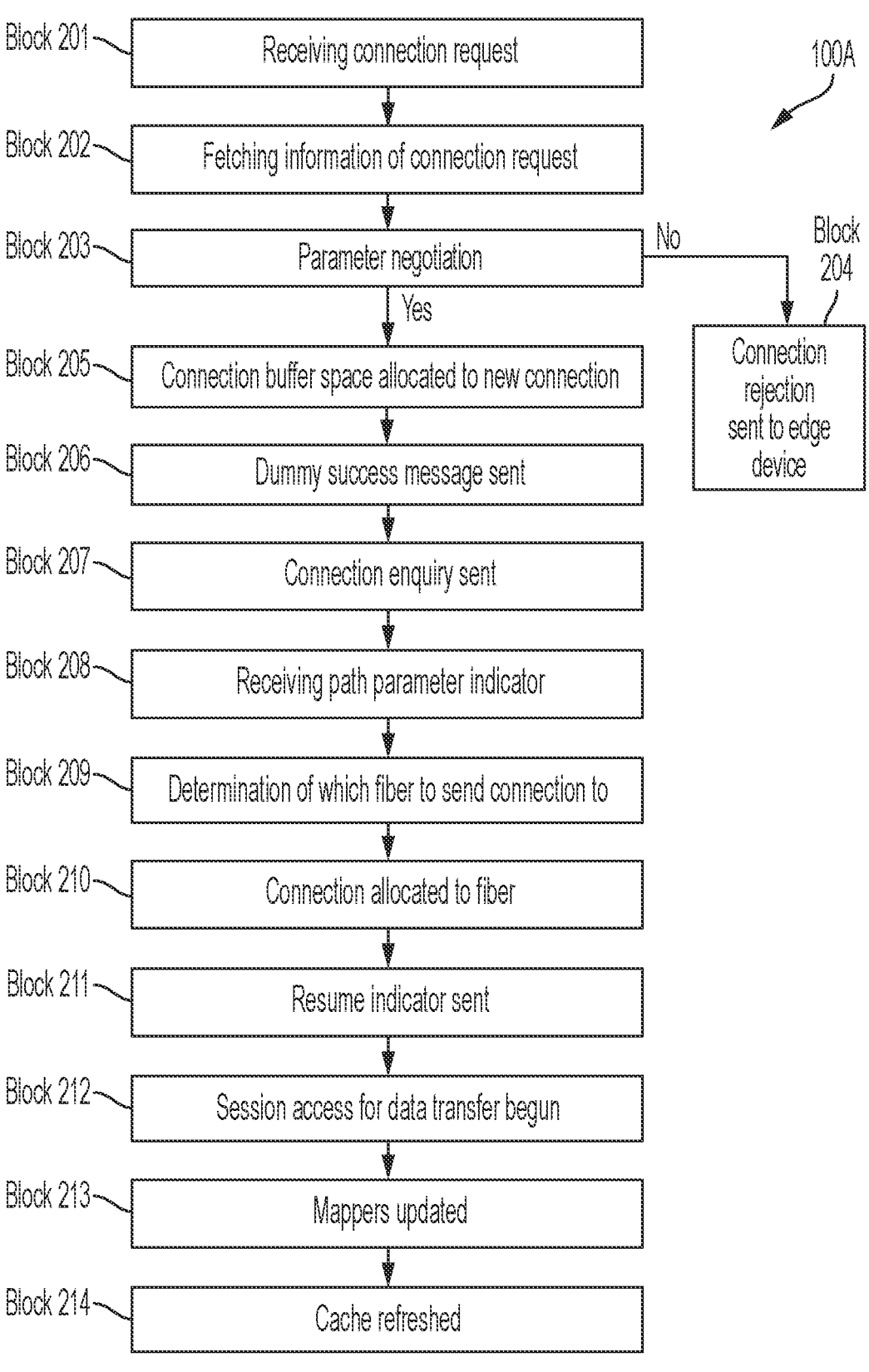

Block 201 — Receiving connection request

100A

Block 202 — Fetching information of connection request

Block 203 — Parameter negotiation

No — Block 204

Yes

Block 205 — Connection buffer space allocated to new connection

Block 204 — Connection rejection sent to edge device

Block 206 — Dummy success message sent

Block 207 — Connection enquiry sent

Block 208 — Receiving path parameter indicator

Block 209 — Determination of which fiber to send connection to

Block 210 — Connection allocated to fiber

Block 211 — Resume indicator sent

Block 212 — Session access for data transfer begun

Block 213 — Mappers updated

Block 214 — Cache refreshed

FIG. 2

PROCESSING DATA CONNECTION REQUESTS FROM EDGE DEVICES

BACKGROUND

The present invention generally relates to programmable computers, and more specifically, to programmable computers and computer-implemented methods operable to process data connection requests from edge devices.

Cloud computing and cloud storage are now popular ways of delivering information and online functionality. While some cloud services focus on providing consumers with a broad range of services and functionalities, including e-tail shopping, research, social media networking, entertainment consumption and protecting important digital documents, other cloud services focus on small businesses, large enterprises, governments and other institutions. Various cloud services provide cloud storage and processing capability to consumers at no charge, while others charge some type of subscription-based fee. There are also private clouds that are owned and controlled by an organization, providing a secure network for sharing critical software and data. For example, hospitals can choose to use public archiving services for electronic medical records (EMR) and patient image data (using PACS), or they can create their own cloud archive solution.

Software as a service (SaaS) cloud solutions include file, document, music, photo and video sharing, backup/restore, domain control (DC) and disaster recovery (DR), along with archiving capabilities. Other cloud computing options include database, big data analytics (including Hadoop and map-reduce based services), cloud drives and other applications exploiting back-end cloud storage. Cloud solutions also extend to products and solutions used for deploying public, private and hybrid clouds.

When any connection in a cloud network established, a processor at a target service of the cloud network allocates a CPU core for the connection from where input/output (I/O) packets are transferred. These cores are generally referred to as "fibers." A fiber binding is performed on a per connection basis at a time when connection requests are received. However, because connections are established without consideration of whether their respective paths are active optimized (AO) or active non-optimized (ANO), it might happen that AO paths from multiple devices overlap with a same core. This results in performance degradation while data is transferred between the edge device and the processor.

SUMMARY

Embodiments of the present invention are directed to a computer-implemented method for processing data connection requests. A non-limiting example of the computer-implemented method includes receiving a connection request from an edge device and responding to the edge device such that the edge device recognizes that a connection is established and that data cannot be sent. The method further includes receiving a response from the edge device indicative of a connection parameter, determining that the connection is fiber-allocatable in accordance with the connection parameter being of a first connection parameter type, selecting one fiber from a plurality of fibers to have the connection allocated thereto based on one or more rules of fiber selection responsive to the determining that the connection is fiber-allocatable and allocating the connection to the one fiber.

As a result of an execution of the computer-implemented method for processing data connection requests in accordance with aspects of the invention, connections between edge devices and fibers in an edge cloud network are controlled for optimization with the result being that they are balanced (i.e., the connections between the devices and the fibers are substantially equally distributed among all of the fibers) and do not tend to overlap (i.e., except to a necessary extent given current conditions, such as where there are more connections than fibers).

In accordance with additional or alternative embodiments of the invention, the responding to the edge device can include sending a dummy packet hold response to the edge device and the dummy packet hold response is decodable by the edge device such that the edge device recognizes that the connection is established and that the data cannot be sent. The responding to the edge device can further include sending a connection enquiry to the edge device and the connection enquiry is configured for manipulation of workload expectation.

In accordance with additional or alternative embodiments of the invention, the response from the edge device indicates that the connection parameter is one of the connection parameter of the first type and a connection parameter of a second type, the connection parameter of the first type is characterized in that the connection will be used for active workloads and the connection parameter of the second type is characterized in that the connection will be used for at least non-active workloads.

In accordance with additional or alternative embodiments of the invention, the one or more rules of fiber selection include one or more of avoidance of unequal overlaps on the one fiber, achieving a workload threshold and availability of processing capability.

In accordance with additional or alternative embodiments of the invention, the allocating of the connection to the one fiber can include sending a packet resume signal to the edge device.

In accordance with additional or alternative embodiments of the invention, the computer-implemented method can further include updating mappers for the connection and repeating the method for any new connection request being received.

Embodiments of the invention further provide computer program products and computer systems having substantially the same features and technical benefits as the above-described computer-implemented methods.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 2 is a flow diagram illustrating additional details of the computer-implemented method for processing data connection requests of FIG. 1 in accordance with one or more embodiments of the present invention;

Figure 1:
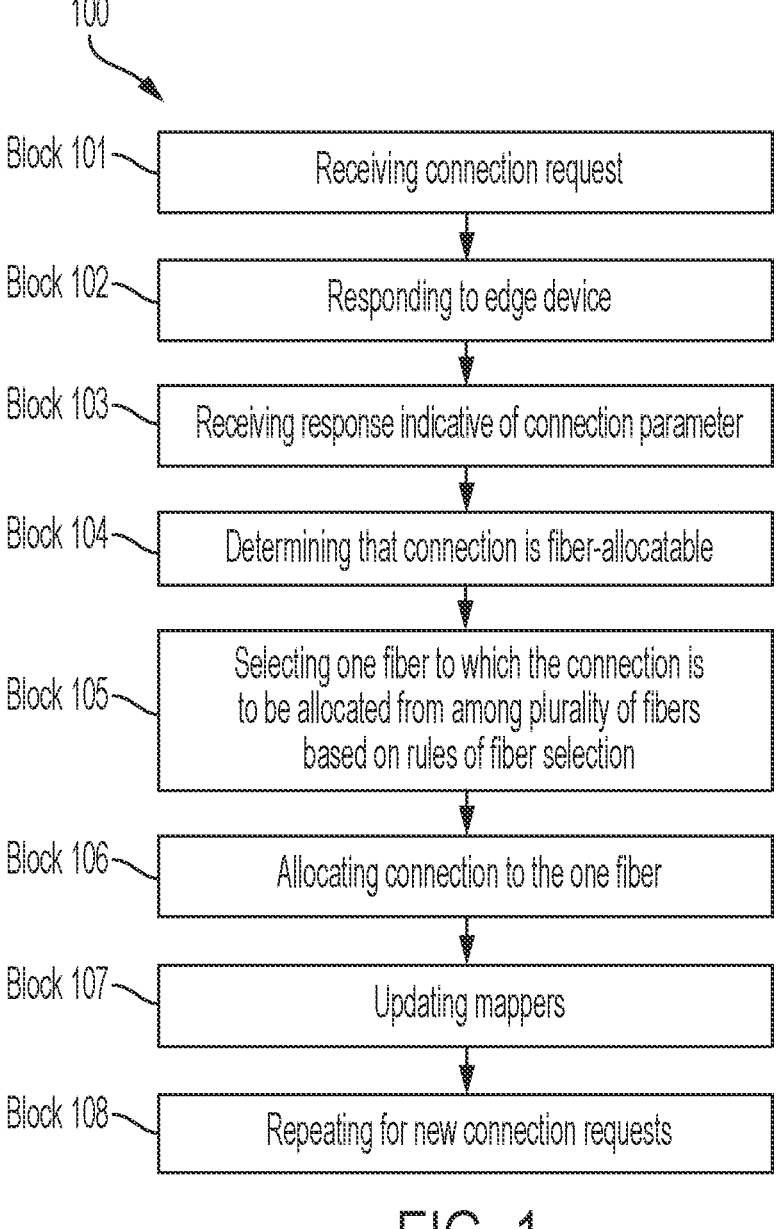
FIG. 1 is a flow diagram illustrating a computer-implemented method for processing data connection requests in accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Turning now to an overview of technologies that are more specifically relevant to aspects of the invention, an edge device is any piece of hardware that controls a flow of data at a boundary of a network or at a boundary between two or more networks. Some common functions of edge devices are the transmission, routing, processing, monitoring, filtering, translation and storage of data passing between networks. Cloud computing and the internet of things (IoT) have elevated the role of edge devices, ushering in the need for more intelligence, computing power and advanced services at network edges. This concept, where processes are decentralized and occur in a more logical physical location, is referred to as edge computing.

There can be many edge devices connected directly to an edge of a cloud network (or an edge cloud network). These edge devices can include or be provided as edge collectors that use edge cloud facilities for data transmission and for various computations. This is especially true for edge sensors that continue generating data after regular time intervals and then send the data to an edge cloud application for processing. This is true as well for edge devices that are responsible for computing (i.e., outcomes) and sending computational data to an edge cloud backbone.

In any case, an edge device makes a connection to an edge cloud service instance and sends data thereto. For such data transmission from edge devices, ethernet connections or other similar connections can be popular and feasible options due to flexibility and reliability. When an edge device uses ethernet for connectivity, generally the edge device and other similar edge devices connect to a target service in the edge cloud network via multiple paths. This allows for a high availability network to be established between the edge cloud service and edge device.

Often, the high availability network will have multiple connections established between an edge device and a target service of an edge cloud network. In these cases, because multiple connections can be established from the edge device to the target services, only one of the paths may be used for data transmission generally. The active optimized (AO) paths are used for active data transmission because it is an optimized path as compared to the others. Those other paths are typically unused until the time AO connections are detected as FAILED/FAULTY. This also supports cache building at the edge cloud and offers additional performance benefits.

When any connection is established, the processor at the target service of the edge cloud network allocates a CPU core for the connection from where input/output (I/O) packets are transferred. These cores are generally referred to as "fibers." A fiber binding is performed on a per connection basis at a time when connection requests are received. However, because connections are established without consideration of whether their respective paths are AO or active non-optimized (ANO), it might happen that AO paths from multiple devices overlap with a same core. This results in performance degradation while data is transferred between the edge device and the processor.

Turning now to an overview of the aspects of the invention, one or more embodiments of the invention address shortcomings of the above-described approach by providing consistent performance with better resource allocation at cloud initiator and target systems, by avoiding packet drops at various networking entities and saving cloud backbone network from congestion and by considering a digestive capability of hosts and applications to avoid retransmission of data and packet drops at application layers.

The above-described aspects of the invention address the shortcomings of known approaches by providing for an equal distribution of active paths to available processing elements to create a state of equilibrium at a consuming location in an edge cloud network that will increase a performance level of edge devices sending data to processors of the edge cloud network. At a time of a creation of an I/O connection to a thread or a CPU core (or fiber) in an edge cloud network, a first check is made as to whether the available paths are AO or ANO. To detect this, a dummy enquiry can be made to the edge cloud network. In case the available device connections are AO, they are allocated fibers that have less workload than others. A further check is then made to determine whether AO paths from multiple devices do not overlap on the same fiber to ensure there are no bottlenecks. If there are no bottlenecks, it can be determined that all the active paths are equally distributed to the available processing elements.

Turning now to a more detailed description of aspects of the present invention, FIG. 1 depicts a computer-implemented method 100 for processing data connection requests in a cloud network or, more particularly, an edge cloud network (hereinafter referred to as an "edge cloud network"). The computer-implemented method 100 is executable at a processing system of a target service of the edge cloud network.

The computer-implemented method 100 includes receiving a connection request from an edge device of the edge cloud network at block 101 and responding to the edge device such that the edge device recognizes that a connection is established and that data cannot be sent at block 102. The responding to the edge device of block 102 can include sending a dummy packet hold response to the edge device. The dummy packet hold response is decodable by the edge device such that the edge device recognizes that the connection is established and that the data cannot be sent at the present time. In addition, the responding to the edge device of block 102 further includes sending a connection enquiry to the edge device. The connection enquiry can be configured for manipulation of workload expectation.

The computer-implemented method 100 further includes receiving a response from the edge device indicative of a connection parameter at block 103, determining that the connection is fiber-allocatable in accordance with the connection parameter being of a first connection parameter type at block 104, selecting one fiber from a plurality of fibers to have the connection allocated thereto based on one or more rules of fiber selection responsive to the determining that the connection is fiber-allocatable at block 105 and allocating the connection to the one fiber at block 106. The response from the edge device can indicate that the connection parameter is one of the connection parameter of the first type and a connection parameter of a second type. The connection parameter of the first type is characterized in that the connection will be used for active workloads. The connection parameter of the second type is characterized in that the connection will be used for at least non-active workloads (i.e., non-active workloads, faulty connections, failed connections and disconnections). The one or more rules of fiber selection on which the selecting of block 105 are based can include one or more of avoidance of unequal overlaps on the one fiber, achieving a workload threshold and availability of processing capability. The allocating of the connection to the one fiber of block 106 can include sending a packet resume signal to the edge device, to which the edge device will respond by changing a state of the connection and accessing its session for data transfer activity.

In accordance with one or more embodiments of the present invention, the computer-implemented method 100 of FIG. 1 can further include updating mappers for the connection at block 107 and repeating the method for any new connection request being received at block 108.

Figure 3:
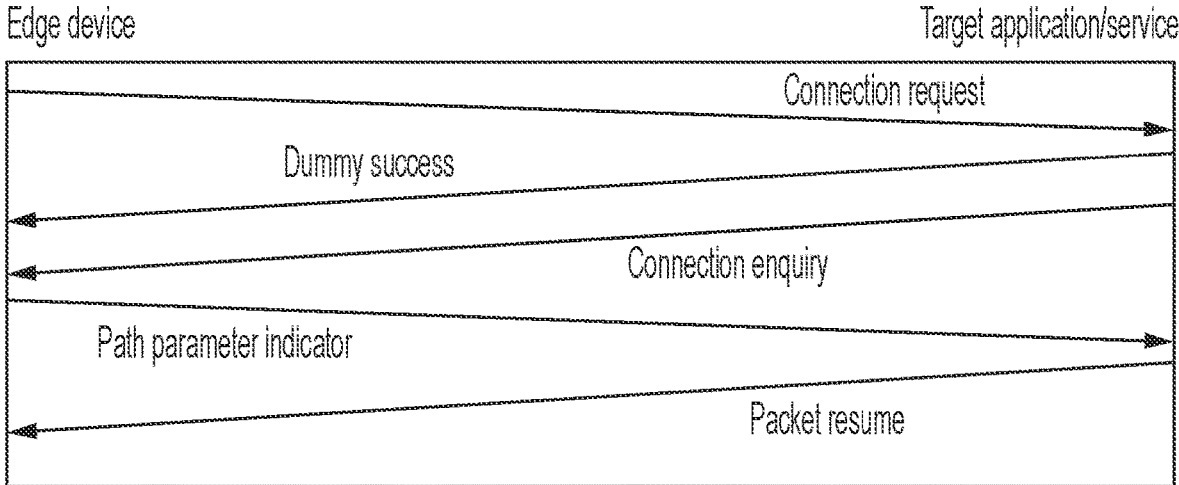
FIG. 3 is a schematic diagram illustrating communications between an edge device and a target application/service in a cloud network executing the computer-implemented method of FIG. 1 in accordance with one or more embodiments of the present invention.

FIG. 2 depicts a computer-implemented method 100A in accordance with aspects of the invention. The computer-implemented method 100A represents a more detailed example implementation of the computer-implemented method 100 (shown in FIG. 1). With reference to FIGS. 2 and 3, the computer-implemented method 100A of FIG. 1 will now be described in greater detail.

At block 201, when any new connection request from the edge device is received by a target service of an edge cloud network, the target service will detect the connection request (i.e., a "CONN_CREATE request"). Subsequently, information of the connection request is fetched for validity by the target service at block 202. Parameter negotiation is then verified at block 203. If negotiated parameters agree, further steps toward establishing the connection will be taken to create. If not, a connection rejection will be sent to the edge device at block 204.

At block 205, a connection buffer space will be allocated to the new connection and a dummy success message will be sent to the edge device with a packet hold instruction at block 206. This packet hold instruction (i.e., a "DUMMY_PACKET_HOLD" instruction) will be decoded by the edge device whereupon the edge device will recognize that the connection is established and that packets cannot be sent yet. A connection enquiry will then be sent to the edge device at block 207 to manipulate the workload expectation of the edge device. In response to this, the edge device sends a path parameter indication to the target service, which is received by the target service at block 208. If the path parameter indication is that the path parameter is active optimized, the connection will used for active workloads. Other path parameter indications can be that the path parameter is active non-optimized, faulty, failed and/or disconnected.

In case the connection is active optimized, it should be allocated to the fiber that has less workload from among the available fibers. This determination is made at block 209 by detecting fiber utilization and by invoking mappers which are configured to direct the active optimized connection to the available fibers and is based on selection rules. The selection rules include, but are not limited to, active optimized connections must not unequally overlap on fibers, a workload of each active optimized connection meets an acceptable threshold and a fiber to which an active optimized connection is allocated should have sufficient processing capability available.

At this point, the connection is allocated to a fiber and an associated core at block 210 and a resume indicator (i.e., a "PACKET_RESUME" indicator) will be shared to the edge device at block 211. The edge device will respond and session access for data transfer activity will begin at block 212. Subsequently, mappers of the target service will be updated at block 213 (i.e., AO to fiber maps) for the new connection and a table cache in the target service will be refreshed at block 214.

The processes of the computer-implemented method 100A can be repeated for each new connection request received from an edge device.

Figure 4:
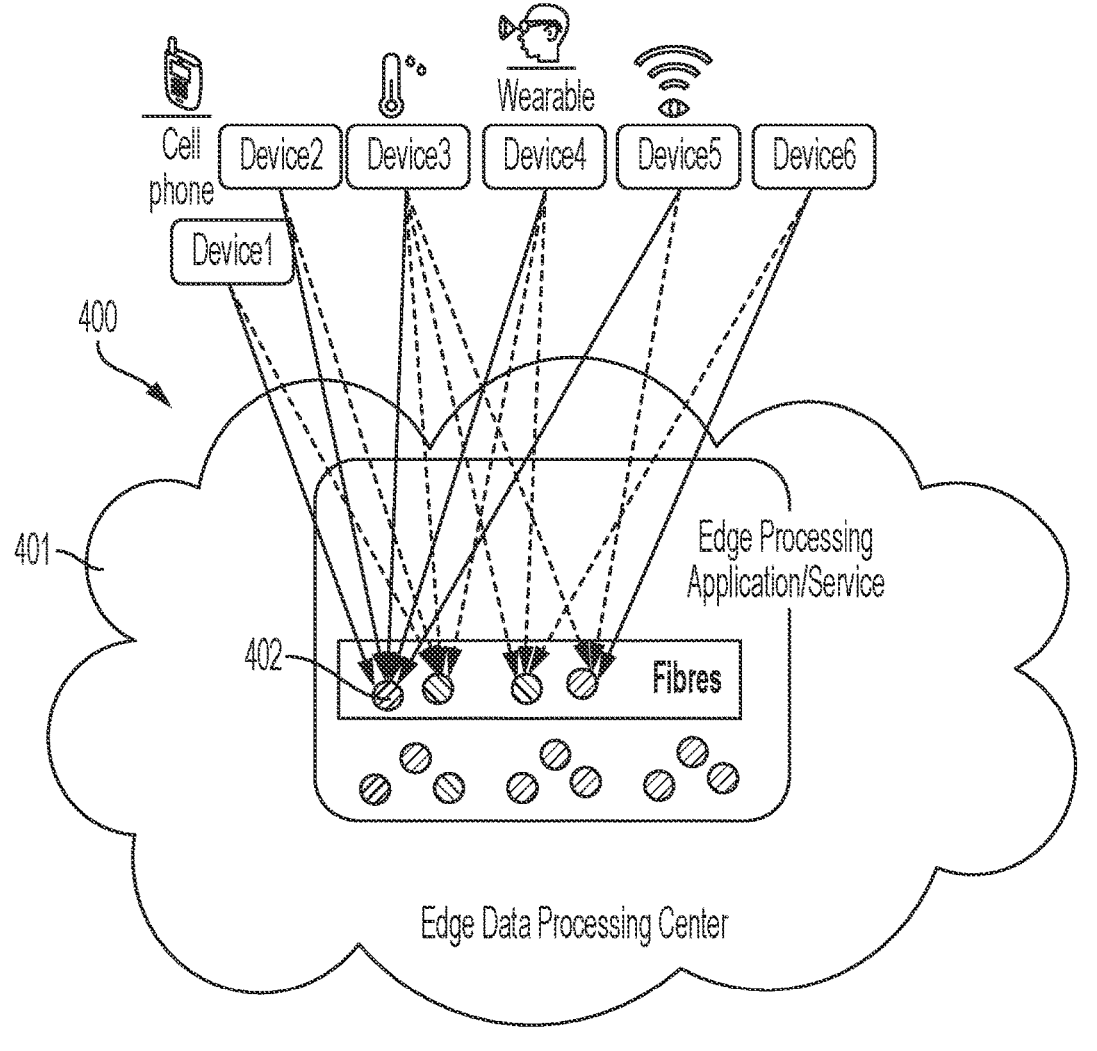
FIG. 4 is a schematic diagram of a cloud network in which the computer-implemented method of FIG. 1 is executed in accordance with one or more embodiments of the present invention.

With reference to FIG. 4, a schematic diagram is provided to illustrate a condition of an edge cloud network 400 in which the computer-implemented method of FIG. 1 and FIGS. 2 and 3 is executed. As shown in FIG. 4, the edge cloud network 400 includes a data processing resource 401 and fibers 402 of an edge processing application or service 403. These fibers 402 are accessible to any one or more of edge devices 1-5, which can be cell phones, edge sensors, wearable communication devices, etc. Although not shown, it is to be understood that the edge cloud network 400 can further include data storage centers and repositories as well as target buffers between the edge devices 1-5 and the fibers 402 and/or between the data processing resource 401 and the fibers 402.

In a conventional edge cloud network, connections are established between the devices and each of the fibers in a non-optimized manner and a result of this non-optimization is that the connections are often overlapped and unbalanced. In the edge cloud network 400, however, the connections 410 between the edge devices 1-5 and the fibers 402 are controlled for optimization with the result being that they are balanced (i.e., the connections between the edge devices 1-5 and the fibers 402 are substantially equally distributed among all of the fibers 402) and do not tend to overlap (i.e., except to a necessary extent given current conditions, such as where there are more connections than fibers 402).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 5:
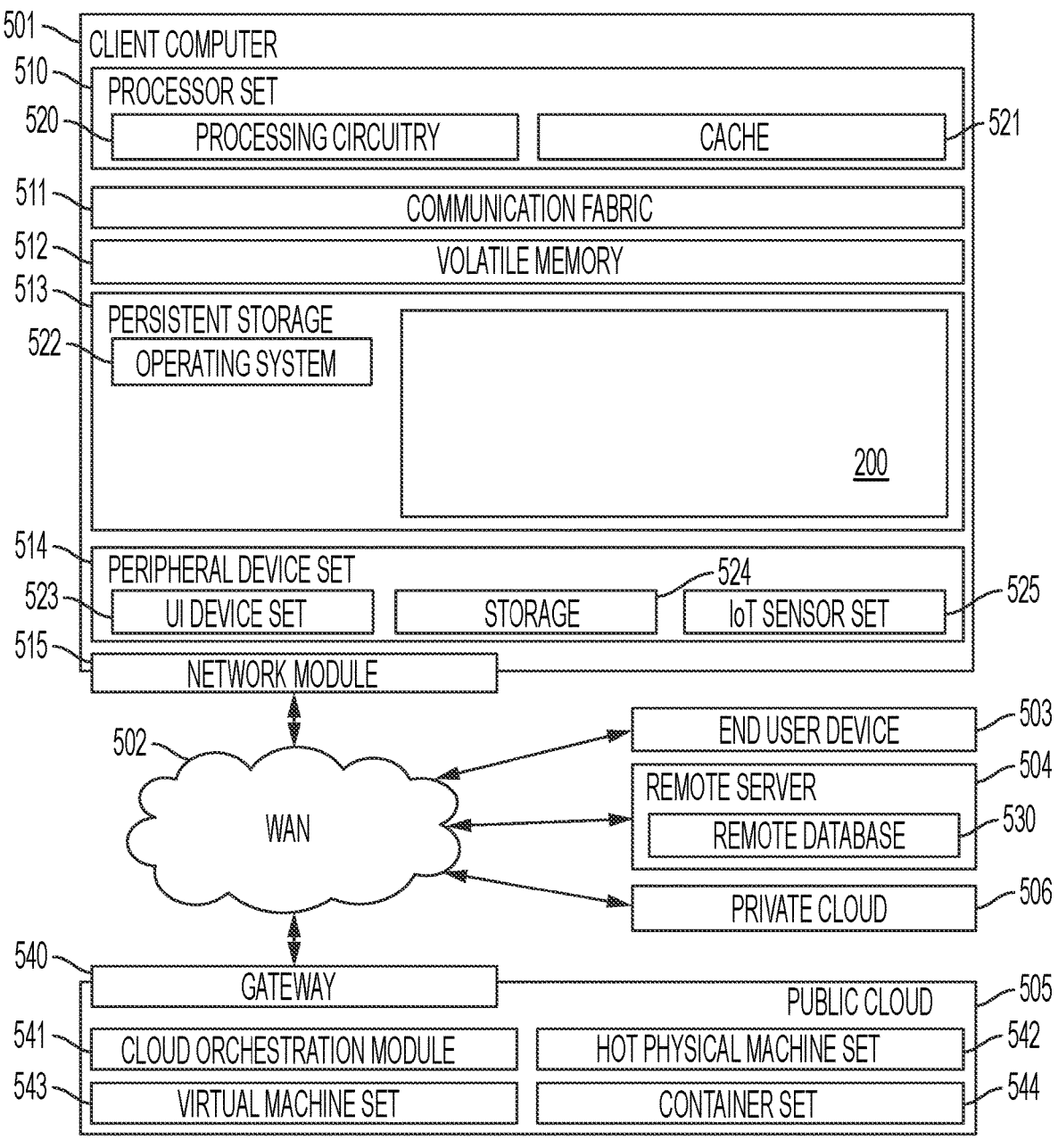
FIG. 5 is a schematic diagram of a computing environment for executing the computer-implemented method of FIG. 1 in accordance with one or more embodiments of the present invention.

With reference to FIG. 5, a computer or computing device 500 that implements the computer-implemented method 100, 100A of FIG. 1 and FIGS. 2 and 3 in accordance with one or more embodiments of the present invention is provided. The computing system of FIG. 5 contains an example of an environment for the execution of at least some of the computer code involved in performing the inventive methods, such as the block 200 of the computer-implemented method 100 of FIG. 1 for processing data connection requests. In addition to the computer-implemented method 100 of block 200, the computing system 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and the computer-implemented method 100 of bock 200, as identified above), peripheral device set 514 (including user interface (UI) device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

The computer 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of the computer-implemented method 100, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

The processor set 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In the computer-implemented method 100, at least some of the instructions for performing the inventive methods may be stored in the block 200 of the computer-implemented method 100 in persistent storage 513.

Communication fabric 511 is the signal conduction path that allows the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 512 is any type of volatile memory now known or to be developed in the future. Examples include dynamic type random access memory (RAM) or static type RAM. Typically, volatile memory 512 is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

Persistent storage 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface-type operating systems that employ a kernel. The code included in the block 200 of the computer-implemented method 100 typically includes at least some of the computer code involved in performing the inventive methods.

Peripheral device set 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion-type connections (for example, secure digital (SD) card, connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

Network module 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

Remote server 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

Public cloud 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for processing data connection requests, the computer-implemented method comprising:

receiving, using a processor, a connection request from an edge device;

responding, using the processor, to the connection request such that the edge device recognizes that a connection is established and that data cannot be sent;

receiving, using the processor, a response from the edge device indicative of a connection parameter;

determining that the connection is fiber-allocatable in accordance with the connection parameter being of a first connection parameter type;

selecting one fiber from a plurality of fibers to have the connection allocated thereto based on one or more rules of fiber selection responsive to the determining that the connection is fiber-allocatable; and allocating the connection to the one fiber, wherein:

the one fiber and the plurality of fibers are central processing unit (CPU) cores of a target service in an edge cloud network and the connection being fiber-allocatable is CPU core-allocatable, the first connection parameter type is active optimized (AO) and is characterized in that the connection is for active workloads and a second connection parameter type is active non-optimized (ANO) and is characterized in that the connection is used for non-active workloads.

2. The computer-implemented method according to claim 1, wherein:

the responding to the edge device comprises sending a dummy packet hold response to the edge device, and the dummy packet hold response is decodable by the edge device such that the edge device recognizes that the connection is established and that the data cannot be sent.

3. The computer-implemented method according to claim 2, wherein:

the responding to the edge device further comprises sending a connection enquiry to the edge device, and the connection enquiry is configured for manipulation of workload expectation.

4. The computer-implemented method according to claim 3, wherein the one or more rules of fiber selection comprise each of avoidance of unequal overlaps on the one fiber, achieving a workload threshold and availability of processing capability.

5. The computer-implemented method according to claim 4, wherein the allocating of the connection to the one fiber comprises sending a packet resume signal to the edge device.

6. The computer-implemented method according to claim 5, further comprising:

updating mappers for the connection; and repeating the method for any new connection request being received.

7. A computer program product for processing data connection requests, the computer program product comprising one or more computer readable storage media having computer readable program code collectively stored on the one or more computer readable storage media, the computer readable program code being executed by a processor of a computer system to cause the computer system to perform a method comprising:

receiving a connection request from an edge device;

responding to the edge device such that the edge device recognizes that a connection is established and that data cannot be sent;

receiving a response from the edge device indicative of a connection parameter;

determining that the connection is fiber-allocatable in accordance with the connection parameter being of a first connection parameter type;

selecting one fiber from a plurality of fibers to have the connection allocated thereto based on one or more rules of fiber selection responsive to the determining that the connection is fiber-allocatable; and allocating the connection to the one fiber, wherein:

the one fiber and the plurality of fibers are central processing unit (CPU) cores of a target service in an edge cloud network and the connection being fiber-allocatable is CPU core-allocatable, the first connection parameter type is active optimized (AO) and is characterized in that the connection is for active workloads and a second connection parameter type is active non-optimized (ANO) and is characterized in that the connection is used for non-active workloads.

8. The computer program product according to claim 7, wherein:

the responding to the edge device comprises sending a dummy packet hold response to the edge device, and the dummy packet hold response is decodable by the edge device such that the edge device recognizes that the connection is established and that the data cannot be sent.

9. The computer program product according to claim 8, wherein:

the responding to the edge device further comprises sending a connection enquiry to the edge device, and the connection enquiry is configured for manipulation of workload expectation.

10. The computer program product according to claim 9, wherein the one or more rules of fiber selection comprise each of avoidance of unequal overlaps on the one fiber, achieving a workload threshold and availability of processing capability.

11. The computer program product according to claim 10, wherein the allocating of the connection to the one fiber comprises sending a packet resume signal to the edge device.

12. The computer program product according to claim 11, wherein the method further comprises:

updating mappers for the connection; and repeating the method for any new connection request being received.

13. A computing system comprising:

a processor;

a memory coupled to the processor; and one or more computer readable storage media coupled to the processor, the one or more computer readable storage media collectively containing instructions that are executed by the processor via the memory to implement a method comprising:

receiving a connection request from an edge device;

responding to the edge device such that the edge device recognizes that a connection is established and that data cannot be sent;

receiving a response from the edge device indicative of a connection parameter;

determining that the connection is fiber-allocatable in accordance with the connection parameter being of a first connection parameter type;

selecting one fiber from a plurality of fibers to have the connection allocated thereto based on one or more rules of fiber selection responsive to the determining that the connection is fiber-allocatable; and allocating the connection to the one fiber, wherein:

the one fiber and the plurality of fibers are central processing unit (CPU) cores of a target service in an edge cloud network and the connection being fiber-allocatable is CPU core-allocatable, the first connection parameter type is active optimized (AO) and is characterized in that the connection is for active workloads and a second connection parameter type is active non-optimized (ANO) and is characterized in that the connection is used for non-active workloads.

14. The computing system according to claim 13, wherein:

the responding to the edge device comprises sending a dummy packet hold response and a connection enquiry to the edge device, the dummy packet hold response is decodable by the edge device such that the edge device recognizes that the connection is established and that the data cannot be sent, and the connection enquiry is configured for manipulation of workload expectation.

15. The computing system according to claim 14, wherein the one or more rules of fiber selection comprise each of avoidance of unequal overlaps on the one fiber, achieving a workload threshold and availability of processing capability.

16. The computing system according to claim 15, wherein the allocating of the connection to the one fiber comprises sending a packet resume signal to the edge device.

17. The computing system according to claim 16, wherein the method further comprises:

updating mappers for the connection; and repeating the method for any new connection request being received.

* * * * *